United States Patent
Nagata et al.

(10) Patent No.: US 7,290,637 B2
(45) Date of Patent: Nov. 6, 2007

(54) HYDRAULIC STEERING MECHANISM AND DRIVING-STEERING-WHEEL SUPPORT MECHANISM

(76) Inventors: Kentaro Nagata, c/o Kanzaki Kokyukoki Mfg. Co., Ltd., 18-1, Inadera 2-chome, Amagasaki-shi, Hyogo (JP) 661-0981; Hiroshi Tottori, c/o Kanzaki Kokyukoki Mfg. Co., Ltd., 18-1, Inadera 2-chome, Amagasaki-shi, Hyogo (JP) 661-0981; Michio Tsukamoto, c/o Kanzaki Kokyukoki Mfg. Co., Ltd., 18-1, Inadera 2-chome, Amagasaki-shi, Hyogo (JP) 661-0981; Norihiro Ishii, c/o Kanzaki Kokyukoki Mfg. Co., Ltd., 18-1, Inadera 2-chome, Amagasaki-shi, Hyogo (JP) 661-0981

( * ) Notice: Subject to any disclaimer, the term of this patent is extended or adjusted under 35 U.S.C. 154(b) by 428 days.

(21) Appl. No.: 10/855,969

(22) Filed: May 28, 2004

(65) Prior Publication Data
US 2004/0251074 A1   Dec. 16, 2004

(30) Foreign Application Priority Data
Jun. 2, 2003   (JP) ............... 2003-157232

(51) Int. Cl.
B62D 5/06   (2006.01)
B62D 5/10   (2006.01)

(52) U.S. Cl. ............ 180/439; 180/437; 180/417

(58) Field of Classification Search ............ 180/417, 180/437, 439, 434
See application file for complete search history.

(56) References Cited

U.S. PATENT DOCUMENTS

| | | | | |
|---|---|---|---|---|
| 2,899,006 A | * | 8/1959 | Brown et al. ............... | 180/437 |
| 3,227,237 A | * | 1/1966 | Moreno et al. ............. | 180/255 |
| 3,980,151 A | * | 9/1976 | Murayama et al. ......... | 180/261 |
| 4,301,886 A | * | 11/1981 | Kinoshita et al. .......... | 180/261 |
| 4,449,600 A | * | 5/1984 | Telfer ......................... | 180/437 |
| 4,609,065 A | | 9/1986 | Shikiya et al. | |
| 5,129,477 A | * | 7/1992 | Hurlburt ..................... | 180/265 |
| 5,921,343 A | | 7/1999 | Yamakaji | |
| 6,056,081 A | * | 5/2000 | Hatlen et al. ............... | 180/346 |
| 6,135,232 A | * | 10/2000 | Salg ........................... | 180/417 |
| 6,267,198 B1 | * | 7/2001 | Hurlburt et al. ............ | 180/414 |
| 6,675,925 B2 | * | 1/2004 | Takahashi et al. .......... | 180/266 |

FOREIGN PATENT DOCUMENTS

EP   0 911 203   4/1999
JP   2002-249064   9/2002

OTHER PUBLICATIONS

European Search Report for European Application No. EP 04 01 3052, European Patent Office, dated Feb. 2, 2005.

* cited by examiner

*Primary Examiner*—Lesley D. Morris
*Assistant Examiner*—Daniel Yeagley
(74) *Attorney, Agent, or Firm*—Sterne, Kessler, Goldstein & Fox, P.L.L.C.

(57) ABSTRACT

The hydraulic steering mechanism according to the present invention includes an axle case, a first steering case, a second steering case, a first arm, a second arms, a third arm, a hydraulic actuator, and a tie rod. The first, second and third arms are provided to the first steering case, the second steering case and the axle case, respectively. The hydraulic actuator includes a cylinder and a piston for moving with respect to each other by an action of hydraulic pressure. The first and second arms have tie rod mounting portions to which the tie rod is mounted. At least one of the first and second arms has a first hydraulic actuator mounting portion to which one of the cylinder and the piston in the hydraulic actuator is mounted. The third arm has a second hydraulic actuator mounting portion to which the other of the cylinder and the piston in the hydraulic actuator is mounted. The first hydraulic actuator mounting portion is at a longer distance from axis lines of the differential yoke shafts than the second hydraulic actuator mounting portion in a plan view when the vehicle is traveling substantially straight.

4 Claims, 8 Drawing Sheets

HYDRAULIC STEERING MECHANISM AND DRIVING-STEERING-WHEEL SUPPORT MECHANISM

BACKGROUND OF THE INVENTION

1. Field of the Invention

The present invention relates to a hydraulic steering mechanism for steering drive wheels by utilizing hydraulic pressure.

2. Related Art

There is conventionally known a hydraulic steering mechanism for steering a pair of drive wheels by connecting a pair of steering cases that are disposed at both ends of an axle case through a tie rod and by turning one of the steering cases about a kingpin shaft by a hydraulic actuator.

However, in the conventional hydraulic steering mechanism, sufficient consideration has not been given to a viewpoint of a reduction in steering force of the hydraulic actuator.

The present invention has been accomplished with the above conventional technique in view, and it is an object of the invention to provide a hydraulic steering mechanism with a simple structure in which a hydraulic actuator for turning a steering case about a kingpin shaft can be miniaturized.

SUMMARY OF THE INVENTION

According to one aspect of the present invention, there is provided a hydraulic steering mechanism that includes an axle case, a first steering case, a second steering case, a first arm, a second arms, a third arm, a hydraulic actuator, and a tie rod. The axle case has a bearing portion for supporting an input shaft extending in a longitudinal direction of a vehicle in a rotatable manner and accommodates a pair of differential yoke shafts operatively connected to the input shaft and extending in a width direction of the vehicle. The pair of first and second steering cases is respectively mounted to ends of the axle case in a turnable manner about a corresponding kingpin shaft axis extending substantially in a vertical direction. The first and second steering cases respectively support first and second drive axles operatively connected to the corresponding differential yoke shafts in a rotatable manner. The first, second and third arms are provided to the first steering case, the second steering case and the axle case, respectively. The hydraulic actuator includes a cylinder and a piston for moving with respect to each other by an action of hydraulic pressure. The tie rod links the first and second steering cases with each other.

The first and second arms have tie rod mounting portions to which the tie rod is mounted. At least one of the first and second arms has a first hydraulic actuator mounting portion to which one of the cylinder and the piston in the hydraulic actuator is mounted. The third arm has a second hydraulic actuator mounting portion to which the other of the cylinder and the piston in the hydraulic actuator is mounted. The first hydraulic actuator mounting portion is at a longer distance from axis lines of the differential yoke shafts than the second hydraulic actuator mounting portion in a plan view when the vehicle is traveling substantially straight.

With this structure, it is possible to miniaturize the hydraulic actuator for turning the steering case.

Preferably, the second hydraulic actuator mounting portion may be disposed on an opposite side of the input shaft to the first hydraulic actuator mounting portion in the width direction of the vehicle.

With this structure, a swinging angle of the hydraulic actuator about the second hydraulic actuator mounting portion can be reduced to thereby smoothly carry out turning of the steering case by the hydraulic actuator.

In one embodiment, preferably, the tie rod mounting portions, the first and second hydraulic actuator mounting portions and the bearing portion may be disposed on the same side of the axle case in the longitudinal direction of the vehicle. The tie rod mounting portions may be closer to the axis lines of the differential yoke shafts than the first and second hydraulic actuator mounting portions in a plan view when the vehicle is traveling substantially straight. The tie rod mounting portions and the first and second hydraulic actuator mounting portions may be disposed so that the tie rod and the hydraulic actuator are positioned below the input shaft and that an outer end of a movable member of the hydraulic actuator in the width direction of the vehicle is positioned above the tie rod in a front view.

With this structure, it is possible to effectively suppress a length and a height of the vehicle.

In the one embodiment, more preferably, the first and second hydraulic actuator mounting portions may be disposed so that the hydraulic actuator is inclined downward from a portion of the hydraulic actuator supported by the first hydraulic actuator mounting portion toward a portion of the hydraulic actuator supported by the second hydraulic actuator mounting portion in a front view.

With this structure, the input shaft can be positioned in as low a position as possible to thereby increase a degree of freedom of design.

According to another aspect of the present invention, there is provided a driving-steering-wheel mechanism for supporting a driving-steering wheel that can be operatively driven by a driving source and steered. The driving-steering-wheel mechanism includes a fixed case member, a movable member, a power transmission shaft, a gear train, an upper bearing and a lower bearing.

The fixed case member accommodates a differential yoke shaft operatively connected to the driving source, and includes a hollow kingpin shaft portion extending downward at an outer end of the fixed case member in a width direction of a vehicle. The movable member supports an axle operatively connected to the driving-steering wheel, and includes a hollow turning portion into which the kingpin shaft portion can be inserted from above. The power transmission shaft is formed to be inserted into the kingpin shaft portion so that an upper end thereof is operatively connected to the differential yoke shaft and that a lower end thereof extends below the kingpin shaft portion. The gear train connects the power transmission shaft and the axle. The upper bearing and a lower bearing are disposed between the kingpin shaft portion and the turning portion so that the turning portion can turn about the kingpin shaft portion, each of the upper bearing and lower bearing having an outer ring disposed to the turning portion in a non-movable manner in an axial direction, an inner ring, and rolling elements disposed between the outer ring and the inner ring. The kingpin shaft portion includes inner ring locking portions to be engaged with the inner rings of the upper bearing and the lower bearing when inserted into the turning portion from above.

In one embodiment, the driving-steering-wheel support mechanism may further include a lower bearing fixing member detachably mounted to the kingpin shaft portion so as to be engaged with a lower surface of the inner ring of the lower bearing.

In another embodiment, instead of or in addition to the lower bearing fixing member, the driving-steering-wheel support mechanism may further include a second upward step provided to the turning portion so as to be engaged with a lower surface of the outer ring of the lower bearing; a spacer extending between the upper bearing and the lower bearing; and an upper bearing fixing member detachably mounted to the turning portion so as to be engaged with an upper surface of the outer ring of the upper bearing. The upper bearing and the lower bearing are prevented from moving in the axial direction with respect to the turning portion by means of the second upward step, the spacer and the upper bearing fixing member.

In another aspect, preferably, a first upward step may be provided to the turning portion so as to be engaged with a lower surface of the outer ring of the upper bearing.

In the various embodiments, the driving-steering-wheel support mechanism may further include a first downward step and a second downward step provided to the kingpin shaft portion so as to be engaged with upper surfaces of the inner rings of the upper bearing and the lower bearing, respectively.

In the still another embodiment, the driving-steering-wheel support mechanism may further include a first upward step and a second upward step provided to the turning portion so as to be engaged with lower surfaces of the outer rings of the upper bearing and the lower bearing, respectively; a spacer detachably mounted to the kingpin shaft so as to be engaged with a lower surface of the inner ring of the upper bearing in a non-movable manner in an axial direction; an upper bearing fixing member detachably mounted to the turning portion so as to be engaged with an upper surface of the outer ring of the upper bearing; and a first downward step and a second downward step provided to the kingpin shaft portion so as to be engaged with upper surfaces of the inner rings of the upper bearing and the lower bearing, respectively.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment 1

Hereinafter, description will be made on a preferred embodiment of the present invention with reference to the accompanying drawings.

Figure 1:
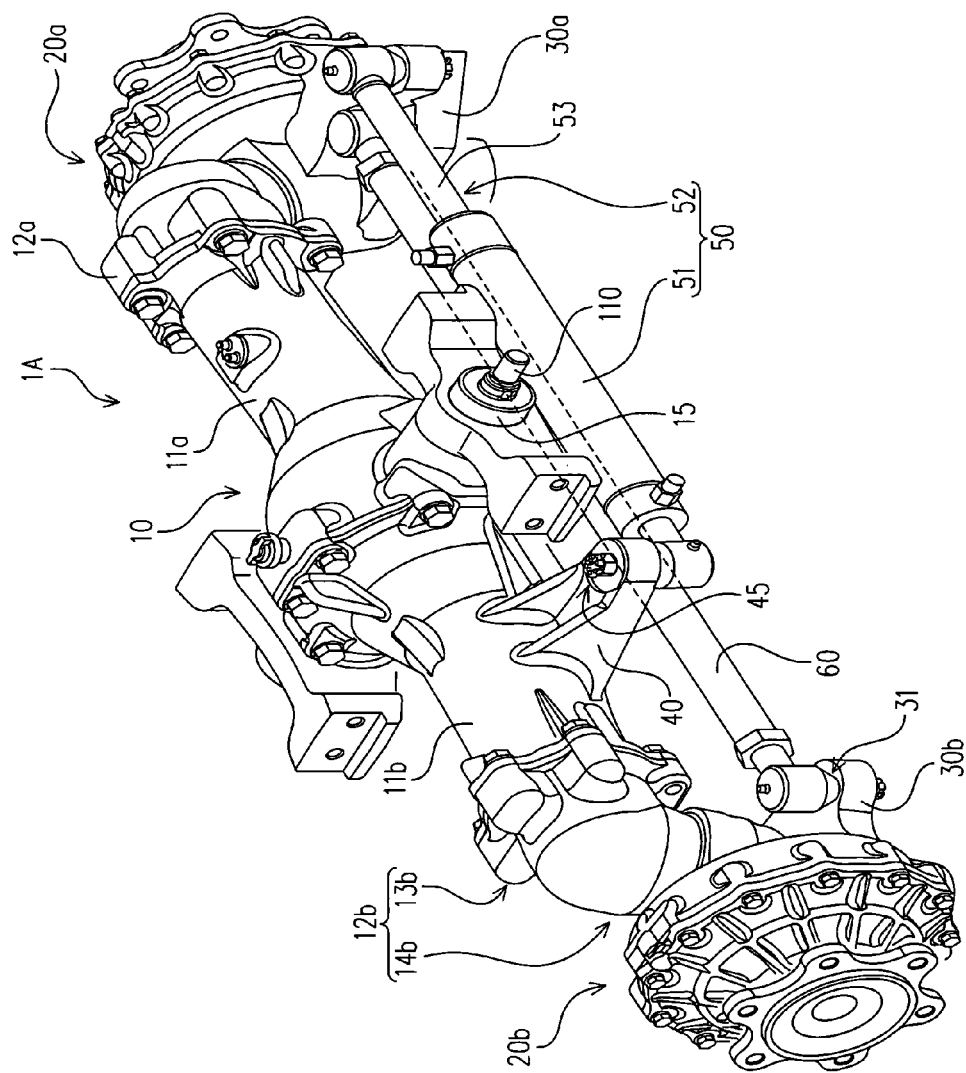
FIG. 1 is a perspective view of a hydraulic steering mechanism according to one embodiment of the present invention, when viewed diagonally from behind.
Figure 2:
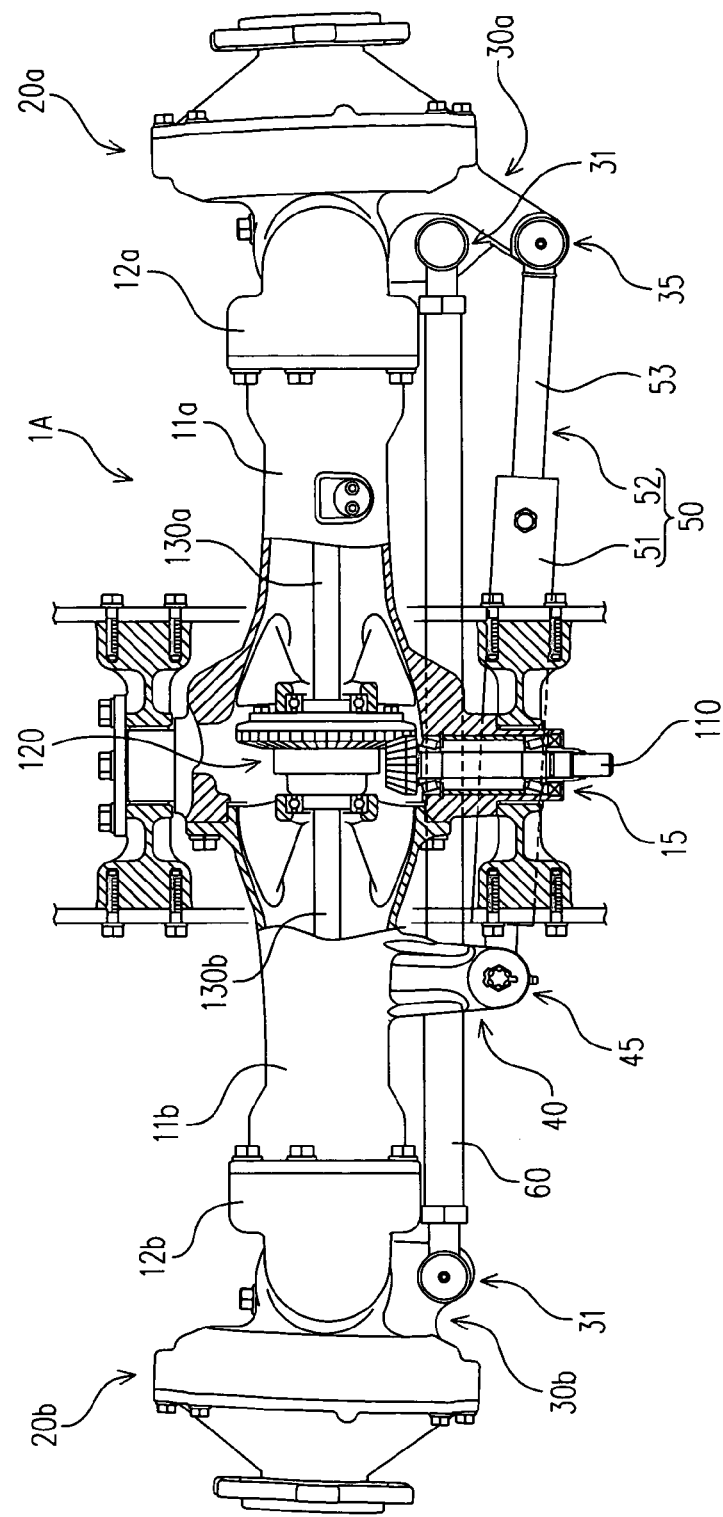
FIG. 2 is a partial cross-sectional plan view of the hydraulic steering mechanism shown in FIG. 1.
Figure 3:
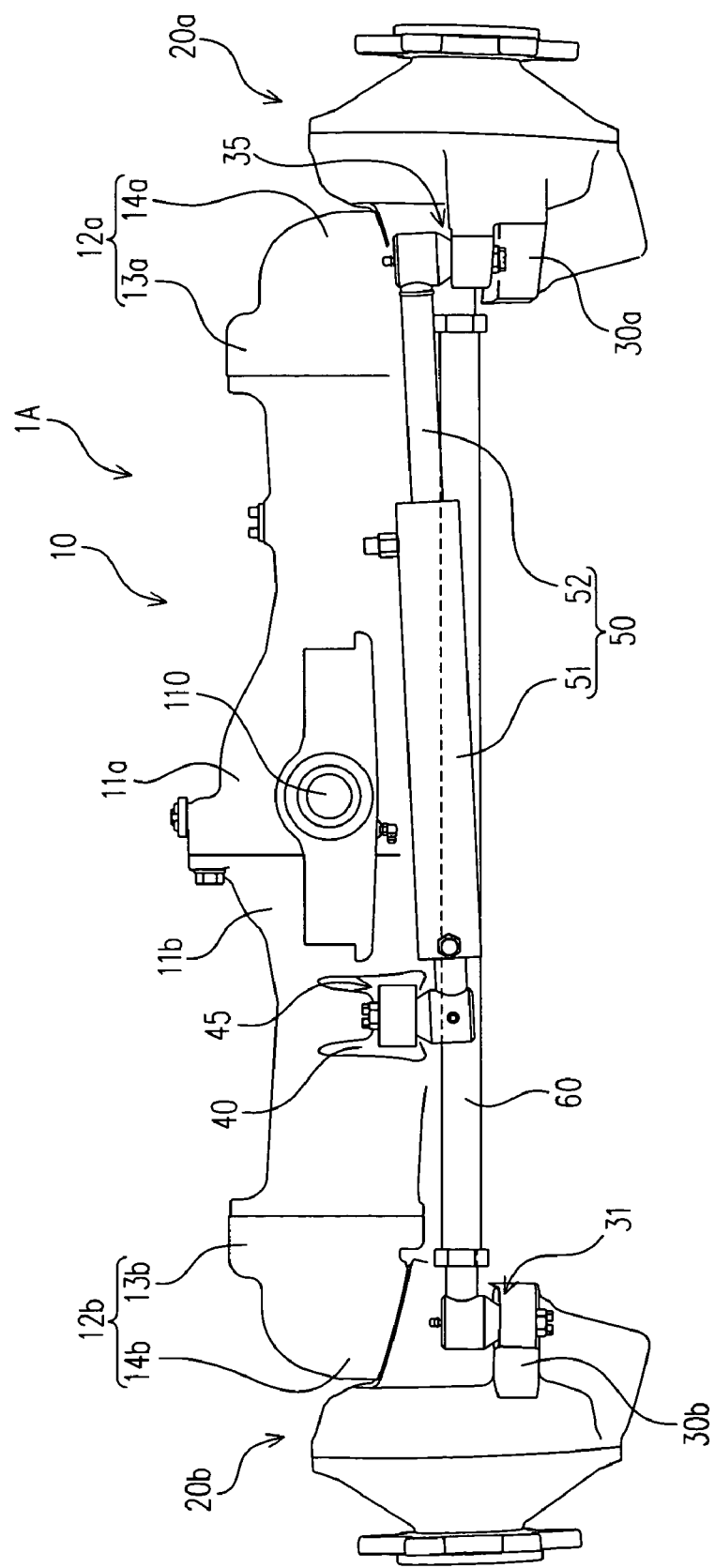
FIG. 3 is a back view of the hydraulic steering mechanism shown in FIGS. 1 and 2.

FIG. 1 is a perspective view of a hydraulic steering mechanism 1A according to this embodiment when viewed diagonally from behind. FIGS. 2 and 3 are respectively a partial cross-sectional plan view and a back view of the hydraulic steering mechanism 1A according to this embodiment.

As shown in FIGS. 1 to 3, the hydraulic steering mechanism 1A according to this embodiment includes an axle case 10, first and second steering cases 20a and 20b respectively provided to both ends of the axle case in a longitudinal direction, first and second arms 30a and 30b respectively provided to first and second steering cases 20a and 20b, a third arm 40 provided to the axle case 10, a hydraulic actuator 50 including a cylinder 51 and a piston 52, and a tie rod 60 for interlocking and linking the first and second steering cases 20a and 20b with and to each other.

The axle case 10 is formed to be able to accommodate a pair of differential yoke shafts 130 extending in a width direction of a vehicle (see FIG. 2).

Furthermore, the axle case 10 has a bearing portion 15 on its side surface oriented inward in a longitudinal direction of the vehicle (see FIGS. 1 and 2).

The bearing portion 15 supports an input shaft 110 operatively connected to a driving source (not shown) of the vehicle along the longitudinal direction of the vehicle so that the input shaft 110 can rotate about an axis line. The bearing portion 15 permits transmission of driving force from the input shaft 110 to the pair of differential yoke shafts 130.

The hydraulic steering mechanism 1A according to this embodiment is formed to steer a pair of front wheels of the vehicle. Therefore, the bearing portion 15 is provided to the side surface of the axle case 10 oriented rearward in the longitudinal direction of the vehicle.

In this embodiment, transmission of power from the input shaft 110 to the pair of differential yoke shafts 130 is carried out through a differential gear 120 accommodated in the axle case 10.

Specifically, the axle case 10 includes a main body 11 accommodating the first and second differential yoke shafts 130a and 130b, and first and second fixed cases 12a and 12b provided to both ends of the main body 11.

In this embodiment, the main body 11 has hollow first and second portions 11a and 11b respectively for accommodating the first and second differential yoke shafts 130a and 130b.

The first and second portions 11a and 11b have openings with larger diameters than the differential gear 120 at opposed ends. By butt-coupling the opposed ends with the differential gear 120 sandwiched between them, the first and second portions 11a and 11b can accommodate the differential gear 120.

Figure 4:
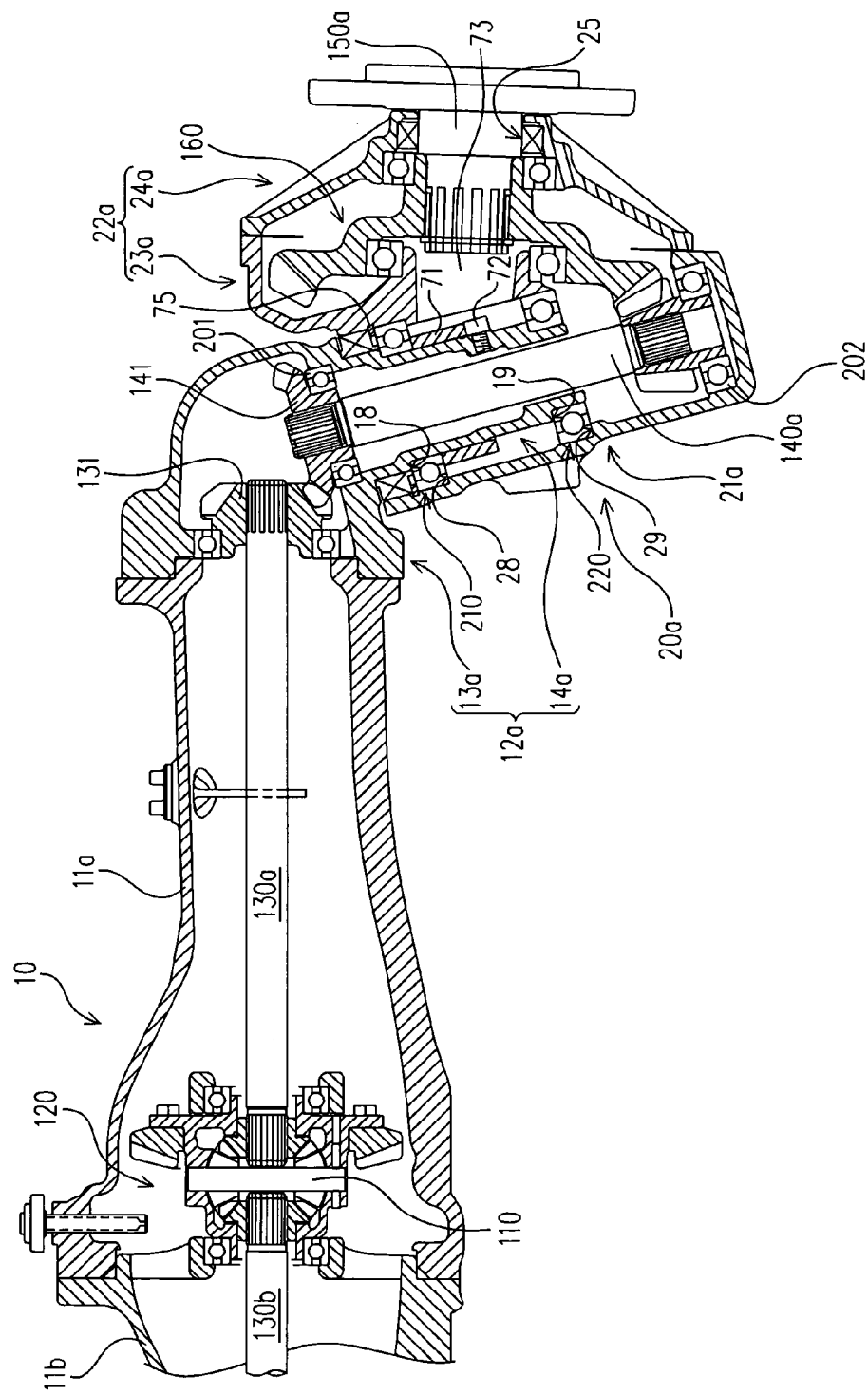
FIG. 4 is a vertical sectional back view of a vicinity of a first fixed case of the hydraulic steering mechanism shown in FIGS. 1-3.

FIG. 4 is a vertical sectional back view of the vicinity of the first fixed case 12a.

As shown in FIG. 4, the first fixed case 12a has a hollow first base end portion 13a connected to an outer end of the first portion 11a in the width direction of the vehicle and a hollow first kingpin shaft portion 14a extending substantially vertically from the first base end portion 13a.

Similarly, the second fixed case 12b has a hollow second base end 13b and a hollow second kingpin shaft 14b (see FIG. 1).

Into the first and second kingpin shaft portions 14a and 14b, first and second power transmission shafts 140a and 140b connected to the first and second differential yoke shafts 130a and 130b are respectively inserted in a rotatable manner about the axis line (the second transmission shaft 140b is not shown).

More specifically, to an upper end of each of the first and second power transmission shafts 140a and 140b, a bevel gear 141 engaged with a bevel gear 131 provided to the corresponding differential yoke shaft 130 so as not to be rotatable with respect to the differential yoke shaft 130 is provided in a non-rotatable manner with respect to the upper end.

The first and second power transmission shafts 140a and 140b have upper ends that are respectively and rotatably supported by the first and second kingpin shaft portions 14a and 14b through bearings 201, and have lower ends that extend respectively downward from the first and second kingpin shaft portions 14a and 14b.

As shown in FIGS. 1 to 3, the first and second steering cases 20a and 20b are respectively connected to the both ends of the axle case 10 in a turnable manner about the kingpin shafts.

The first and second steering cases 20a and 20b have substantially the same structures.

Therefore, the following description of the first steering case 20a is also applied to the second steering case 20b.

Figure 5:
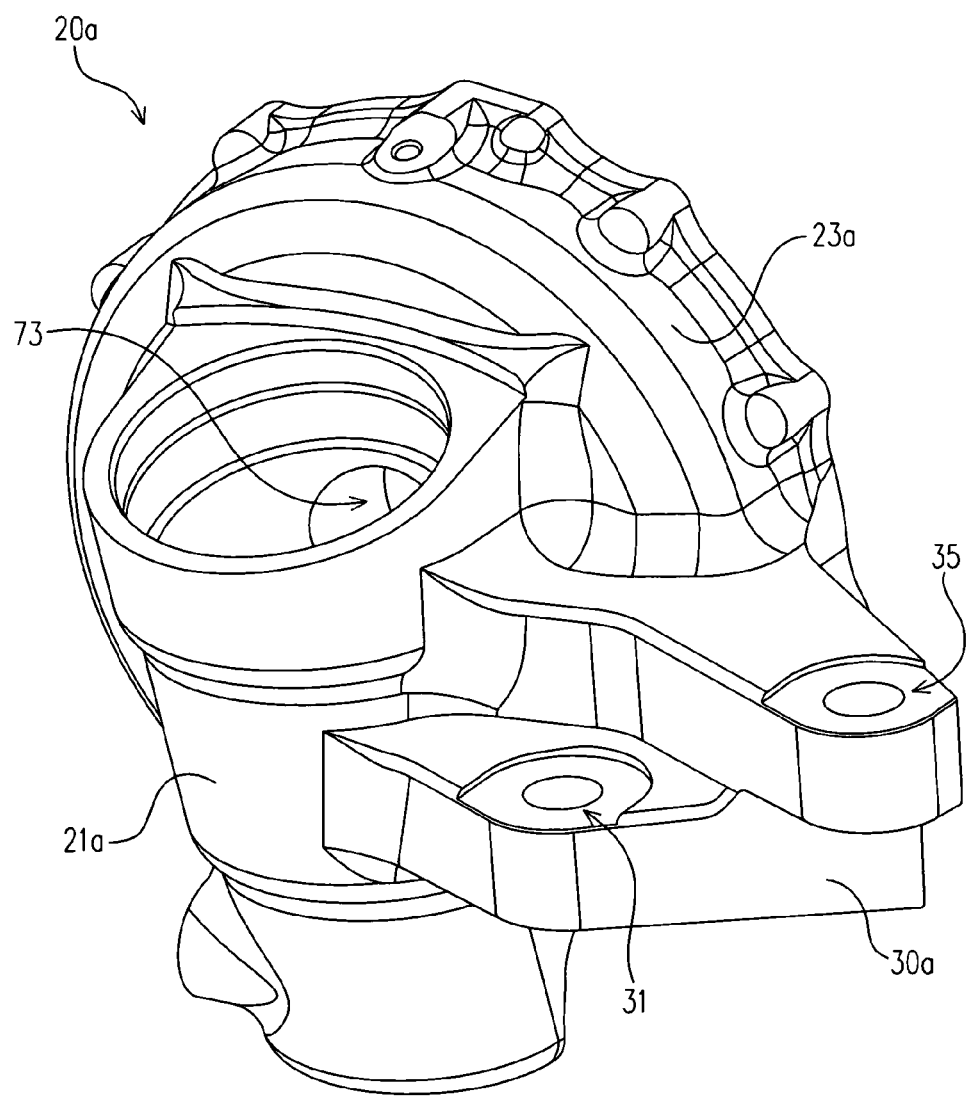
FIG. 5 is a perspective view of a first steering case of the hydraulic steering mechanism shown in FIGS. 1-4.

FIG. 5 is a perspective view of the first steering case 20a.

As shown in FIGS. 4 and 5, the first steering case 20a has a first turning portion 21a fitted over the first kingpin shaft portion 14a of the first fixed case 12a from outside in a rotatable manner and a first outer portion 22a extending outward in the width direction of the vehicle from the first turning portion 21a.

The first turning portion 21a has an opening at its upper portion. In other words, the first turning portion 21a is fitted over the first kingpin shaft portion 14a from below.

A lower portion of the first turning portion 21a is closed and supports the lower end of the first power transmission shaft 140a through a bearing 202 in a rotatable manner.

The first outer portion 22a supports a corresponding first axle 150a in a rotatable manner and accommodates a power transmission member for interlocking and linking the first power transmission shaft 140a and the first axle 150a with and to each other.

In this embodiment, the first outer portion 22a has a base end portion 23a formed integrally with the first turning portion 21a and a lid portion 24a detachably connected to the base end portion 23a.

The base end portion 23a and the lid portion 24a are formed to support a final gear 160 forming the power transmission member.

The final gear 160 is operatively connected to the first power transmission shaft 140a and supported on the first axle 150a in a non-rotatable manner with respect to the axle 150a.

Here, description will be made on a structure for preventing withdrawal of the first steering case 20a from the first fixed case 12a.

As shown in FIG. 4, the first turning portion 21a of the first steering case 20a is fitted over the first kingpin shaft portion 14a of the first fixed case 12a so as to be in a rotatable manner relative to the first kingpin shaft portion 14a via an upper bearing 210 and a lower bearing 220 spaced from each other in a vertical direction.

Specifically, the first kingpin shaft portion 14a has a first downward step 18 to be engaged with an upper surface of an inner ring of the upper bearing 210 and a second downward step 19 to be engaged with an upper surface of an inner ring of the lower bearing 220 on an outer peripheral surface of the first kingpin shaft portion 14a.

On the other hand, the first turning portion 21a has a first upward step 28 to be engaged with a lower surface of an outer ring of the upper bearing 210 and a second upward step 29 to be engaged with a lower surface of an outer ring of the lower bearing 220 on an inner peripheral surface of the first turning portion 21a.

In other words, the upper bearing 210 is sandwiched between the first downward step 18 and the first upward step 28, and the lower bearing 220 is sandwiched between the second downward step 19 and the second upward step 29.

The first downward step 18, the first upward step 28, the second downward step 19, and the second upward step 29 are preferably formed substantially throughout circumferences.

With such a structure, loads applied to the upper bearing 210 and the lower bearing 220 can be made uniform to thereby effectively prevent breakage and the like.

In this embodiment, in order to prevent withdrawal of the first turning portion 21a from the first kingpin shaft portion 14a, a spacer 71 disposed to be engaged with a lower surface of the inner ring of the upper bearing 210 and a fastening member 72 for retaining the spacer 71 are provided.

The spacer 71 is preferably in a ring shape to be fitted over the first kingpin shaft portion 14a so as to be outside of the first kingpin portion 14a.

With this preferable structure, the inner ring of the upper bearing 210 can be retained throughout its circumference.

The fastening member 72 is detachably secured to a peripheral wall of the first kingpin shaft portion 14a. The fastening member 72 is fastened to the first kingpin shaft portion 14a so as to engage with and retain a lower surface of the spacer 71.

The fastening member 72 is accessible from outside in a state where the first turning portion 21a is fitted over or inserted around the first kingpin shaft portion 14a.

Concretely, an access opening 73 for access to the fastening member 72 is formed in a peripheral wall of the first turning portion 21a.

In this embodiment, the fastening member 72 is fastened to an outer surface of the first kingpin shaft portion 14a.

Therefore, the access opening 73 is formed in the outer surface of the first turning portion 21a so that the outer surface of the first kingpin shaft portion 14a is accessible from outside.

More specifically, in this embodiment, the access opening 73 communicates with an axle insertion opening 25 formed in the first outer portion 22a and an operator can gain access to the fastening member 72 through the axle insertion opening 25 and the access opening 73.

Though various structures of the fastening member 72 are conceivable, the fastening member 72 is preferably a bolt from a viewpoint of workability and the like.

A reference numeral 75 in FIG. 4 designates a snap ring for preventing an upward movement of the upper bearing 210.

The snap ring 75 is disposed in advance in the first turning portion 21a before insertion of the first kingpin shaft portion 14a into the first turning portion 21a of the first steering case 20a.

In other words, upon connection between the first turning portion 21a and the first kingpin shaft portion 14a, the lower bearing 220 is first inserted into the first turning portion 21a so as to be placed on the second upward step 29 and the spacer 71 is then inserted. At this time, the spacer 71 is retained by the lower bearing 220.

Then, the upper bearing 210 is inserted into the first turning portion 21a so as to be engaged with the first upward step 28 and is prevented from withdrawal by means of the snap ring 75.

In this state, the first kingpin shaft portion 14a is inserted into the first turning portion 21a and the fastening member 72 is fastened through the access opening 73 to fix the spacer 71 to a predetermined position.

The first and second arms 30a and 30b respectively extend inward in the width direction of the vehicle from the first and second steering cases 20a and 20b.

As shown in FIGS. 1, 5 and the like, the first and second arms 30a and 30b are formed integrally with the first and second steering cases 20a and 20b, respectively, in this embodiment.

The first and second arms 30a and 30b respectively have tie rod mounting portions 31 to which the tie rod 60 is mounted.

In other words, in the hydraulic steering mechanism 1A according to this embodiment, the first and second steering cases 20a and 20b are turned in synchronization and about the corresponding kingpin shaft portion by the tie rod 60 mounted to the first and second arms 30a and 30b.

The hydraulic actuator 50 has the cylinder 51 and the piston 52 as described above.

The piston 52 has a piston main body accommodated in the cylinder 51 in a slidable manner and a piston rod 53 projecting outside the cylinder 51 from the piston main body.

In the hydraulic actuator 50, pressure oil is supplied and discharged to and from an oil chamber in the cylinder 51, so that the cylinder 51 and the piston 52 move with respect to each other.

In other words, in the hydraulic actuator 50, one of the cylinder 51 and the piston 52 (piston rod 53) operates as a fixed member and the other operates as a movable member for reciprocating with respect to the fixed member according to control of supply and discharge of pressure oil to and from the oil chamber.

At least one of the first and second arms 30a and 30b (first arm 30a in this embodiment shown in the drawings) has a first hydraulic actuator mounting portion 35 to which one of the cylinder 51 and the piston rod 53 (piston rod 53 in this embodiment shown in the drawings) of the hydraulic actuator 50 is mounted in addition to the tie rod mounting portion 31.

The other of the cylinder 51 and the piston rod 53 (cylinder 51 in this embodiment shown in the drawings) of the hydraulic actuator 50 is mounted to a second hydraulic actuator mounting portion 45 provided to the third arm 40.

With this structure, by controlling supply and discharge of the pressure oil to and from the hydraulic actuator 50, the corresponding steering case 20 (first steering case 20a in this embodiment shown in the drawings) is turned about the kingpin shaft by the movable member of the hydraulic actuator 50.

In the hydraulic steering mechanism 1A according to this embodiment, as is well shown in FIG. 2, the first hydraulic actuator mounting portion 35 is at a longer distance from axis lines of the differential yoke shafts 130 than the second hydraulic actuator mounting portion 45 in a plan view when the vehicle is traveling substantially straight to thereby miniaturize the hydraulic actuator 50.

In other words, from a viewpoint of strength required of at least one of the first and second arms 30a and 30b (first arm 30a in this embodiment shown in the drawings) provided with the first hydraulic actuator mounting portion 35 and the third arm 40 provided with the second hydraulic actuator mounting portion 45, it is preferable to dispose the first and second hydraulic actuator mounting portions 35 and 45 close to the axis lines of the differential yoke shafts 130.

On the other hand, from a viewpoint of force required to turn the steering case 20 on a side connected to the hydraulic actuator 50 (first steering case 20a in this embodiment shown in the drawings and hereinafter referred to as an operating-side steering case), it is preferable to dispose the first hydraulic actuator mounting portion 35 away from the axis lines of the differential yoke shafts 130.

Specifically, the operating-side steering case is turned about the kingpin shaft by reciprocation of the movable member of the hydraulic actuator 50. An axis line of the kingpin shaft is positioned substantially in the same position as the axis lines of the differential yoke shafts 130 in the longitudinal direction of the vehicle. Therefore, by disposing a connection position (position of the first hydraulic actuator mounting portion 35) of the movable member of the hydraulic actuator 50 and the operating-side steering case away from the kingpin shaft, it is possible to turn the operating-side steering case about the kingpin shaft with small force and, as a result, the hydraulic actuator can be miniaturized.

Moreover, in this embodiment, as shown in FIGS. 1 to 3, the second hydraulic actuator mounting portion 45 is on an opposite side of the input shaft 110 to the first hydraulic actuator mounting portion 35 in the width direction of the vehicle to thereby facilitate smooth turning of the operating-side steering case.

In other words, with this structure, it is possible to suppress a swinging angle of the hydraulic actuator 50 about the second hydraulic actuator mounting portion upon turning of the operating-side steering case about the kingpin shaft. Therefore, the operating-side steering case can be turned more smoothly by the hydraulic actuator 50.

Furthermore, in this embodiment, the tie rod mounting portions 31, the first and second hydraulic actuator mounting portions 35 and 45, and the bearing portion 15 are on the same side of the axle case 10 in the longitudinal direction of the vehicle (see FIG. 2).

In other words, in this embodiment, the tie rod mounting portions 31 and the first and second hydraulic actuator mounting portions 35 and 45 are provided on the same side as the input shaft 110 (i.e., inner side in the longitudinal direction of the vehicle) to thereby reduce a longitudinal length of the whole vehicle including the hydraulic steering mechanism 1A.

Moreover, in this embodiment, in the form in which the tie rod mounting portions 31, the first and second hydraulic actuator mounting portions 35 and 45, and the bearing portion 15 are disposed on the same side with respect to the axle case 10 in the longitudinal direction of the vehicle, the following structure is provided so as to prevent interference between the respective members and to minimize a height of the vehicle.

In other words, in this embodiment, in a plan view when the vehicle is traveling substantially straight, the tie rod mounting portions 31 are closer to the axis lines of the differential yoke shafts 130 than the first and second hydraulic actuator mounting portions 35 and 45 (see FIG. 2). The tie rod mounting portions 31 and the first and second hydraulic actuator mounting portions 35 and 45 are disposed so that the tie rod 60 and the hydraulic actuator 50 are positioned below the input shaft 110 and that an outer end of the movable member of the hydraulic actuator 50 in the width direction of the vehicle is positioned above the tie rod 60 in a front view (see FIG. 3).

With this structure, it is unnecessary to secure a space for disposing the hydraulic steering mechanism 1A above the input shaft 110; therefore, the height of the vehicle can be minimized.

Figure 6:
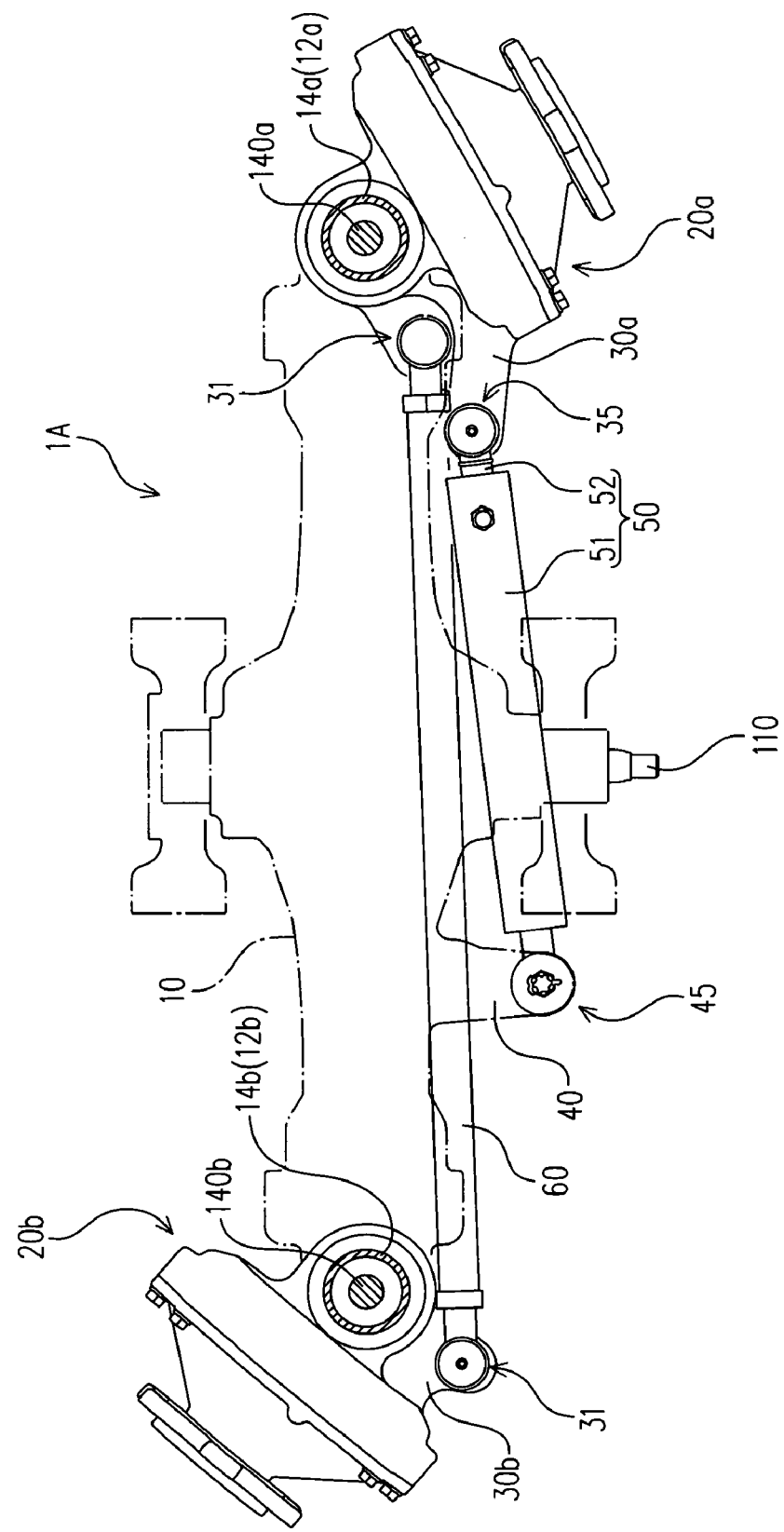
FIG. 6 is a schematic plan view of the hydraulic steering mechanism shown in FIGS. 1-5, when the first steering case is made the largest turn.

Furthermore, it is possible to effectively prevent interference between the hydraulic actuator 50 and the tie rod 60 when the operating-side steering case (first steering case 20a in this embodiment shown in the drawings) makes the largest turn (see FIG. 6).

More preferably, the first and second hydraulic actuator mounting portions 35 and 45 can disposed so that the hydraulic actuator 50 is inclined downward from a portion of the hydraulic actuator 50 supported by the first hydraulic actuator mounting portion 35 toward a portion of the hydraulic actuator 50 supported by the second hydraulic actuator mounting portion 45 in a front view (see FIG. 3).

With this structure, the input shaft 110 can be disposed in as low as possible while preventing interference with the hydraulic actuator 50, thereby increasing a degree of freedom of design with regard to the vehicle height and the like.

Embodiment 2

Hereinafter, description will be made on another preferred embodiment of the present invention with reference to FIGS. 7 and 8.

Figure 7:
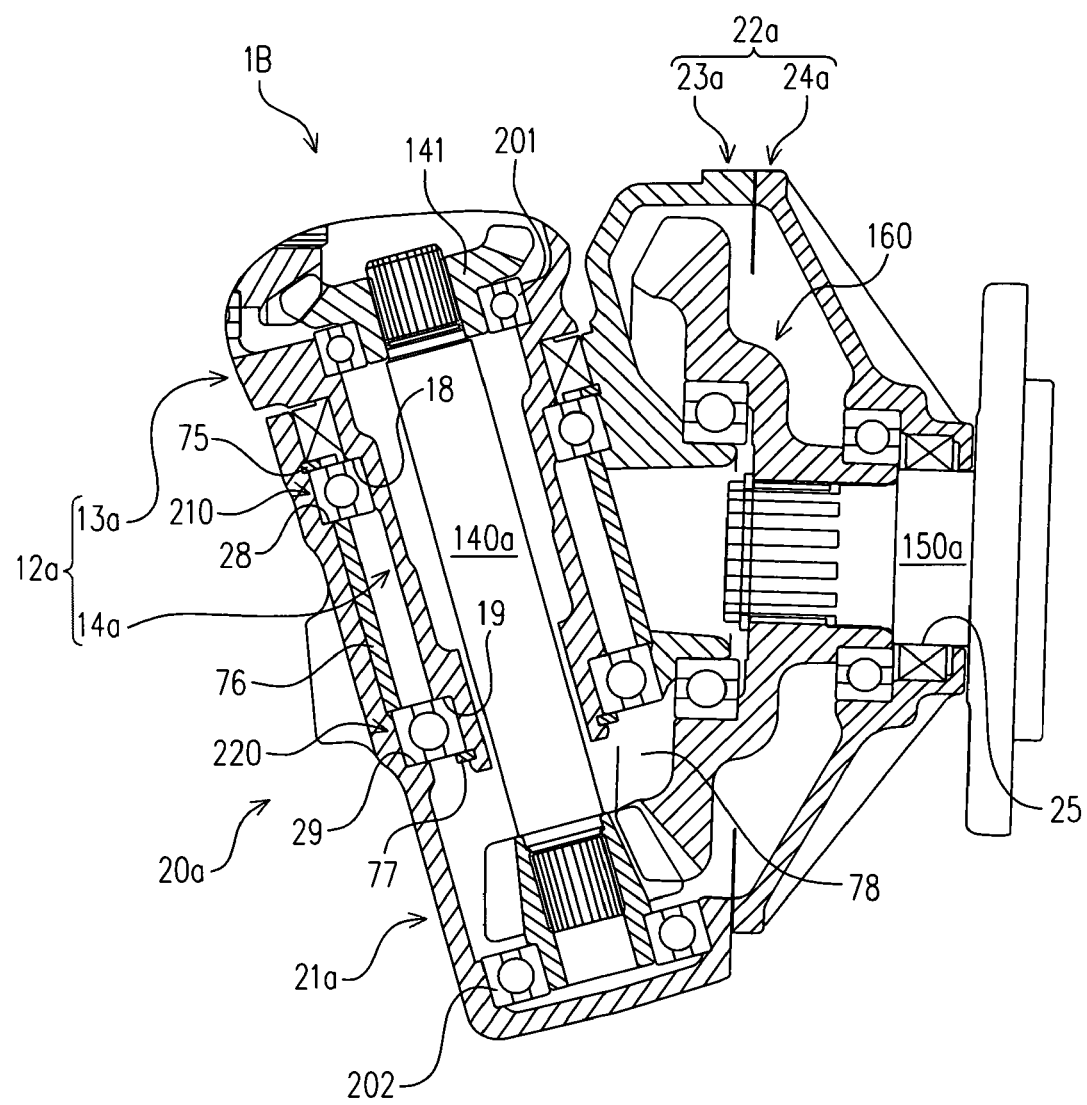
FIG. 7 is a vertical sectional back view of a vicinity of a fixed case of a hydraulic steering mechanism according to another embodiment of the present invention.

FIG. 7 is a vertical sectional back view of a vicinity of a fixed case in a hydraulic steering mechanism 1B according to this embodiment. FIG. 8 is an exploded vertical sectional back view of the fixed case and a steering case.

In the drawings, members similar or corresponding to those in the first embodiment are provided with the same reference numerals; therefore, description thereof will not be made.

The hydraulic steering mechanism 1B according to this embodiment is different from the first embodiment only in that the structure for preventing withdrawal of the first steering case 20a from the first fixed case 12a and is substantially the same in other structures.

In other words, the hydraulic steering mechanism 1B according to this embodiment includes a spacer 76 extending between the upper bearing 210 and the lower bearing 220, and a snap ring 77 for preventing movements of the first kingpin shaft portion 14a and the first turning portion 21a with respect to each other in the vertical direction in stead of the spacer 71 and the fastening member 72 in the first embodiment.

Specifically, in this embodiment, when the first fixed case 12a and the first steering case 20a are connected to each other (see FIG. 7), a lower end of the first kingpin shaft portion 14a extends below a lower surface of the lower bearing 220, so that the lower end of the kingpin shaft portion 14a is accessible from outside.

Figure 8:
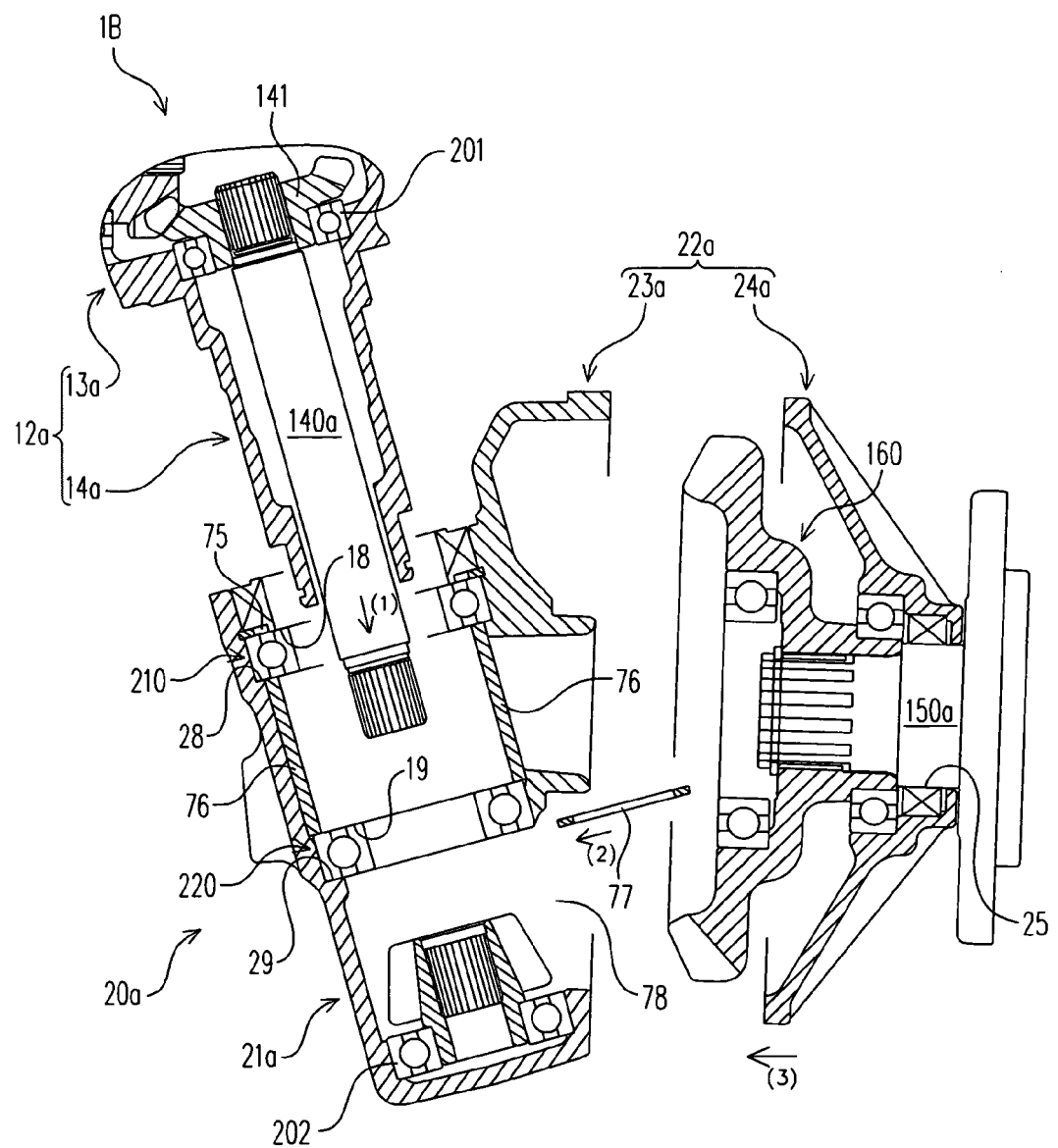
FIG. 8 is an exploded vertical sectional back view of the fixed case and a steering case of the hydraulic steering mechanism shown in FIG. 7.

In other words, as shown in FIGS. 7 and 8, the first steering case 20a is provided with an opening 78 oriented outward so as to permit power transmission from the first power transmission shaft 140a to the final bevel gear 160.

The lower end of the first kingpin shaft portion 14a is accessible from outside through the opening 78 in a state where the first kingpin shaft portion 14a and the first steering case 20a are connected to each other.

The snap ring 77 is connected to a lower extension portion of the first kingpin shaft portion 14a so as to be engaged with a lower surface of the inner ring of the lower bearing 220.

The spacer 76 is disposed in the first turning portion 21a of the first steering case 20a so that an upper end surface of the spacer 76 is engaged with the lower surface of the outer ring of the upper bearing 210 and a lower end surface of the spacer 76 is engaged with the upper surface of the outer ring of the lower bearing 220.

The spacer 76 is preferably engaged with the upper bearing 210 and the lower bearing 220 throughout the circumference.

Here, with reference to FIG. 8, description will be made on a procedure for mounting the first steering case 20a to the fixed case 12a.

First, the lower bearing 220 is disposed on the second upward step 29 of the first turning portion 21a. Then, the spacer 76 is placed on an upper surface of the lower bearing 220.

At this time, the spacer 76 also functions as a jig for properly placing the lower bearing 220 on the second upward step 29.

Then, the upper bearing 210 is disposed on the spacer 76 and the first upward step 28, and the snap ring 75 is disposed.

In this state, the first kingpin shaft portion 14a is inserted from an upper portion of the first turning portion 21a and the snap ring 77 is connected to the lower extension portion of the first kingpin shaft portion 14a.

Then, the lid portion 24a supporting the final bevel gear 160 is connected to the base end portion 23a.

According to the above hydraulic steering mechanism 1B having the structure for preventing withdrawal, a high load from the axle case 10 can be supported more reliably.

In other words, though a load applied to the spacer 71 is supported at one point by the fastening member 72 in the first embodiment, the load applied to the spacer 76 is supported by the whole lower bearing 220 to thereby support the high load more reliably in this embodiment.

This specification is by no means intended to restrict the present invention to the preferred embodiments set forth therein. Various modifications to the hydraulic steering mechanism and the driving-steering-wheel support mechanism may be made by those skilled in the art without departing from the spirit and scope of the present invention as define in the appended claims.

The invention claimed is:

1. A hydraulic steering mechanism comprising
    an axle case which has a bearing portion for supporting an input shaft extending in a longitudinal direction of a vehicle in a rotatable manner and accommodates a pair of differential yoke shafts operatively connected to the input shaft and extending in a width direction of the vehicle;
    a pair of first and second steering cases respectively mounted to ends of the axle case in a turnable manner about a corresponding kingpin shaft axis extending substantially in a vertical direction, the first and second steering cases respectively supporting first and second drive axles operatively connected to the corresponding differential yoke shafts in a rotatable manner;
    first and second arms provided to the first and second steering cases, respectively;
    a third arm provided to the axle case;
    a hydraulic actuator having a cylinder and a piston for moving with respect to each other by an action of hydraulic pressure; and a tie rod for linking the first and second steering cases with each other, wherein the first and second arms have tie rod mounting portions to which the tie rod is mounted, at least one of the first and second arms has a first hydraulic actuator mounting portion to which one of the cylinder and the piston in the hydraulic actuator is mounted, the third arm has a second hydraulic actuator mounting portion to which the other of the cylinder and the piston in the hydraulic actuator is mounted, the first hydraulic actuator mounting portion is at a longer distance from axis lines of the differential yoke shafts than the second hydraulic actuator mounting portion in a plan view when the vehicle is traveling substantially straight, the tie rod mounting portions, the first and second hydraulic actuator mounting portions and the bearing portion are disposed on the same side of the axle case in the longitudinal direction of the vehicle, the tie rod mounting portions are closer to the axis lines of the differential yoke shafts than the first and second hydraulic actuator mounting portions in a plan view when the vehicle is traveling substantially straight, and the tie rod mounting portions and the first and second hydraulic actuator mounting portions are disposed so that the tie rod and the hydraulic actuator are positioned below the input shaft and that an outer end of a movable member of the hydraulic actuator in the width direction of the vehicle is positioned above the tie rod in a front view.

2. A hydraulic steering mechanism according to claim 1, wherein the first and second hydraulic actuator mounting portions are disposed so that the hydraulic actuator is inclined downward from a portion of the hydraulic actuator supported by the first hydraulic actuator mounting portion toward a portion of the hydraulic actuator supported by the second hydraulic actuator mounting portion in a front view.

3. A hydraulic steering mechanism comprising:

an axle case which has a bearing portion for supporting an input shaft extending in a longitudinal direction of a vehicle in a rotatable manner and accommodates a pair of differential yoke shafts operatively connected to the input shaft and extending in a width direction of the vehicle;

a pair of first and second steering cases respectively mounted to ends of the axle case in a turnable manner about a corresponding kingpin shaft axis extending substantially in a vertical direction, the first and second steering cases respectively supporting first and second drive axles operatively connected to the corresponding differential yoke shafts in a rotatable manner;

first and second arms provided to the first and second steering cases, respectively;

a third arm provided to the axle case;

a hydraulic actuator having a cylinder and a piston for moving with respect to each other by an action of hydraulic pressure; and a tie rod for linking the first and second steering cases with each other, wherein the first and second arms have tie rod mounting portions to which the tie rod is mounted, at least one of the first and second arms has a first hydraulic actuator mounting portion to which a movable member of the hydraulic actuator is mounted, the third arm has a second hydraulic actuator mounting portion to which a fixed member of the hydraulic actuator is mounted, the tie rod mounting portions, the first and second hydraulic actuator mounting portions and the bearing portion are disposed on the same side of the axle case in the longitudinal direction of the vehicle, the third arm extends beyond the tie rod so that the second hydraulic actuator mounting portion is at a longer distance from axis lines of the differential yoke shafts than the tie rod in a plan view when the vehicle is traveling substantially straight, the first hydraulic actuator mounting portion is at a longer distance from axis lines of the differential yoke shafts than the second hydraulic actuator mounting portion in a plan view when the vehicle is traveling substantially straight, and the first hydraulic actuator mounting portion is disposed so that an outer end of the movable member of the hydraulic actuator in the width direction of the vehicle is positioned above the tie rod.

4. A hydraulic steering mechanism according to claim 3, wherein the second hydraulic actuator mounting portion is disposed on an opposite side of the input shaft to the first hydraulic actuator mounting portion in the width direction of the vehicle.

* * * * *